US006411908B1

(12) United States Patent
Talbott

(10) Patent No.: US 6,411,908 B1
(45) Date of Patent: Jun. 25, 2002

(54) CONDITION-BASED PROGNOSIS FOR MACHINERY

(75) Inventor: Carlos M. Talbott, West Chicago, IL (US)

(73) Assignee: Machinery Prognosis, Inc., Elko, NV (US)

( * ) Notice: Subject to any disclaimer, the term of this patent is extended or adjusted under 35 U.S.C. 154(b) by 132 days.

(21) Appl. No.: 09/630,985

(22) Filed: Aug. 2, 2000

Related U.S. Application Data

(60) Provisional application No. 60/200,127, filed on Apr. 27, 2000.

(51) Int. Cl.$^7$ .................................................. G01B 3/00
(52) U.S. Cl. ............................. 702/34; 702/35; 702/81; 702/181; 702/182; 700/21; 700/79
(58) Field of Search ............................. 702/34, 33, 35, 702/81, 82, 181, 182, 183, 184, 185; 73/53.02, 118.1, 117.3, 787; 706/45, 912, 56; 700/79, 292, 21

(56) References Cited

U.S. PATENT DOCUMENTS

| | | | |
|---|---|---|---|
| 4,525,763 A | 6/1985 | Hardy et al. | 361/24 |
| 4,641,248 A | 2/1987 | Suzuki et al. | 700/292 |
| 4,768,383 A | 9/1988 | Koyama et al. | 73/787 |
| 5,210,704 A | 5/1993 | Husseiny | 702/34 |
| 5,608,845 A | 3/1997 | Ohtsuka et al. | 706/45 |
| 5,750,887 A | 5/1998 | Schricker | 73/117.3 |
| 5,777,211 A | 7/1998 | Binienda et al. | 73/53.05 |
| 5,867,809 A | 2/1999 | Soga et al. | 702/130 |
| 6,023,150 A | 2/2000 | Patino et al. | 320/132 |

OTHER PUBLICATIONS

Richard E. Barlow et al.: Probability Models, *Statistical Theory of Reliability and Life Testing*, pp. 7–11, 1975.

Andrew K.S. Jardine: On the Optimization of Condition–Based Maintenance Decisions, *Maintenance and Reliability Conference Proceeedings*, pp. 10.01–10.07, vol. 1 and 2, May 10–12, 1999.

Dr. Michael J. Roemer et al.: Diagnosis and Life Monitoring of Rotor Systems using Finite Element Based Neural Networks, *Condition Monitoring and Diagnostic Engineering Management*, pp. 345–352, vol. 1, Jun. 26–28, 1995.

Anthony M. Smith, P.E.: RCM–A Proven Approach, *Reliability–Centered Maintenance*, pp. 43–55.

B.R. Upadhyaya et al.: Monitoring and Prognosis of Plant Components, *P/PM Technology*, pp. 43–49, vol. 7, Dec. 1994.

C.M. Talbott: Prognosis of Residual Machine Life, *International Journal of COMADEM*, pp. 11–18, 1999.

*Primary Examiner*—John S. Hilten
*Assistant Examiner*—Hien Vo
(74) *Attorney, Agent, or Firm*—Pauley Petersen Kinne & Erickson

(57) ABSTRACT

A method for assembling condition monitoring histories of same-type machines that have lived in same-type environments and have failed as a result of the same failure mode, estimating the remaining life with confidence bounds in an operating machine that presents a set of condition symptoms over time and that is diagnosed with a pending failure mode, and deciding when to replace/repair an operating machine (diagnosed with a specific failure mode condition) based on the cost of its estimated performance over its predicted remaining life.

27 Claims, 1 Drawing Sheet

Machine A

| Temp (°F) | Vibration (in/sec) | Power ($/day) | Residual Life (days) |
|---|---|---|---|
| 110 | 0.05 | 1.0 | 155 |
| 112 | 0.07 | 1.0 | 125 |
| 112 | 0.09 | 1.0 | 95 |
| 114 | 0.11 | 1.2 | 65 |
| 118 | 0.25 | 1.4 | 35 |
| 122 | 0.39 | 1.8 | 15 |
| 135 | 0.52 | 1.9 | 7 |
| 153 | 0.79 | 2.0 | 5 |
| 164 | 0.95 | 2.1 | 3 |
| 189 | 1.25 | 2.1 | 1 |

Machine B

| Temp (°F) | Vibration (in/sec) | Power ($/day) | Residual Life (days) |
|---|---|---|---|
| 124 | 0.11 | 1.1 | 110 |
| 124 | 0.13 | 1.1 | 80 |
| 125 | 0.13 | 1.1 | 50 |
| 131 | 0.18 | 1.4 | 20 |
| 148 | 0.28 | 1.7 | 15 |
| 159 | 0.35 | 2.0 | 10 |
| 164 | 0.49 | 2.2 | 8 |
| 176 | 0.64 | 2.3 | 6 |
| 183 | 0.75 | 2.4 | 4 |
| 199 | 0.87 | 2.5 | 2 |

Machine C

| Temp (°F) | Vibration (in/sec) | Power ($/day) | Residual Life (days) |
|---|---|---|---|
| 112 | 0.02 | 0.9 | 360 |
| 112 | 0.06 | 1.0 | 330 |
| 112 | 0.08 | 1.0 | 300 |
| 115 | 0.12 | 1.2 | 270 |
| 117 | 0.15 | 1.3 | 240 |
| 135 | 0.33 | 1.6 | 50 |
| 152 | 0.52 | 1.9 | 40 |
| 180 | 0.79 | 2.1 | 30 |
| 197 | 0.95 | 2.3 | 20 |
| 210 | 1.25 | 2.4 | 10 |

Machine A

| Temp (°F) | Vibration (in/sec) | Power ($/day) | Residual Life (days) |
|---|---|---|---|
| 110 | 0.05 | 1.0 | 155 |
| 112 | 0.07 | 1.0 | 125 |
| 112 | 0.09 | 1.0 | 95 |
| 114 | 0.11 | 1.2 | 65 |
| 118 | 0.25 | 1.4 | 35 |
| 122 | 0.39 | 1.8 | 15 |
| 135 | 0.52 | 1.9 | 7 |
| 153 | 0.79 | 2.0 | 5 |
| 164 | 0.95 | 2.1 | 3 |
| 189 | 1.25 | 2.1 | 1 |

Machine B

| Temp (°F) | Vibration (in/sec) | Power ($/day) | Residual Life (days) |
|---|---|---|---|
| 124 | 0.11 | 1.1 | 110 |
| 124 | 0.13 | 1.1 | 80 |
| 125 | 0.13 | 1.1 | 50 |
| 131 | 0.18 | 1.4 | 20 |
| 148 | 0.28 | 1.7 | 15 |
| 159 | 0.35 | 2.0 | 10 |
| 164 | 0.49 | 2.2 | 8 |
| 176 | 0.64 | 2.3 | 6 |
| 183 | 0.75 | 2.4 | 4 |
| 199 | 0.87 | 2.5 | 2 |

Machine C

| Temp (°F) | Vibration (in/sec) | Power ($/day) | Residual Life (days) |
|---|---|---|---|
| 112 | 0.02 | 0.9 | 360 |
| 112 | 0.06 | 1.0 | 330 |
| 112 | 0.08 | 1.0 | 300 |
| 115 | 0.12 | 1.2 | 270 |
| 117 | 0.15 | 1.3 | 240 |
| 135 | 0.33 | 1.6 | 50 |
| 152 | 0.52 | 1.9 | 40 |
| 180 | 0.79 | 2.1 | 30 |
| 197 | 0.95 | 2.3 | 20 |
| 210 | 1.25 | 2.4 | 10 |

*FIG. 1*

CONDITION-BASED PROGNOSIS FOR MACHINERY

CROSS REFERENCE TO RELATED APPLICATION

This application claims the benefit of U.S. Provisional Application No. 60/200,127, file Apr. 27, 2000.

BACKGROUND OF THE INVENTION

1. Field of the Invention

This invention relates to a method for estimating the remaining life with confidence bounds in an operating machine and deciding when to replace/repair an operating machine based on the cost of its estimated performance over its predicted remaining life.

2. Description of Related Art

Probabilistic modeling of machine life and other nonparametric reliability methods developed over the past five decades consider only age, and not condition, as a predictor of remaining life [see, for example, Barlow & Proschan (1975) or Ohtsuka et al., U.S. Pat. No. 5,608,845]. Now that new sensor technologies offer a means to track condition as well as age, better estimates of residual life can result. Recent work by Jardine et al. (1999) using Cox's proportional hazard modeling concept integrates both age and condition information into an Age Replacement decision model without differentiating between various failure modes.

Neural network models for estimating residual machine life have been proposed both as a "virtual" sensing technology [e.g., Roemer & Rieger (1995) and Upadhyaya et al. (1994)] and as a means to estimate remaining life [e.g., Talbott (1999)]. Husseiny, U.S. Pat. No. 5,210,704, describes "an expert system, rule-based failure data bank, a predictor, a performance evaluator and a system identifier" for prognosis of helicopter gearboxes and other rotating equipment.

Damage accumulation models of residual machine life describe remaining life as a function of material creep, fatigue, embrittlement, or corrosion damage propagation until some failure limit is reached. These models presuppose knowledge of a "damage limit" which is analogous to current practice of establishing "alarm" limits currently in vogue within the predictive maintenance community [see Talbott (1997)]. For example, Hardy et al., U.S. Pat. No. 4,525,763, estimate remaining useful life of an electric motor based on thermal damage and its relationship to a user-specified "desired life" limit.

Koyama et al., U.S. Pat. No. 4,768,383, predict remaining lifetime in metal materials, such as used in boilers and other equipment subject to high pressure and temperature, that are subject to creep damage. Their method depends upon a priori knowledge of a "creep rupture time" as a function of the degree of grain elongation and deformation over time.

Schricker, U.S. Pat. No. 5,750,887, approximates the remaining life of engine oil by trending certain oil quality estimators such as soot, oxidation, viscosity, and total base number and extrapolating a function of these estimators in time to a "predetermined threshold" value.

Binieda et al., U.S. Pat. No. 5,777,211, determine remaining useful life of automatic transmission fluid based on an empirically derived function of multiple factors affecting a "maximum life index . . . constant for each fluid/vehicle combination . . ." without specifying as to how such a constant is derived.

Patino et al., U.S. Pat. No. 6,023,150, claim a method to estimate remaining life cycles in a rechargeable battery pack by means of a look-up table relating battery cell impedance after recharge, adjusted for temperature, to remaining life cycles; however, the means for deriving such a look-up table are not disclosed.

Variations on the theme of damage accumulation modeling estimate residual life as a direct function of various environmental parameters by assuming that these parameters are indeed causing material creep, fatigue, embrittlement, or corrosion damage propagation. For example, Soga et al., U.S. Pat. No. 5,867,809, claim a remaining life estimation system for integrated circuit components on a printed circuit board based on a "predetermined life equation" such as the Coffin Manson Equation. Their system approximates remaining life in an electronic component as a function of the maximum temperature, largest temperature difference, number of temperature cycles, and other such environmental parameters collected over the operating lifetime of the component. Their system also claims a replacement decision process that compares estimated remaining life against a certain "guaranteed life" criterion.

Current industry practices for machinery condition monitoring are focused on diagnostic matters and, in terms of predicting remaining life, rely on end-users to establish their own "alarm" or "failure" levels for each deployed condition monitoring technology based on the end-user's experience or engineering judgment. Available software programs then employ simple regression models for time-to-alarm forecasting without benefit of any knowledge regarding the value of remaining life about to be discarded.

The invention described below offers machinery end-users an estimate of remaining life with a statistical confidence bounds in a machine diagnosed with a specific failure mode and presenting a set of multivariate symptoms associated with this particular failure mode. This invention, though it does not claim any diagnostic content, requires a moderate quantity of historical failure data coupled with an accurate diagnostic methodology.

SUMMARY OF THE INVENTION

According to a preferred embodiment of this invention, the described method requires condition-based data histories of same-type machines that have all lived in same-type operational environments and that have all failed according to the same failure mode. These data are obtained from end-users who monitor their machines with appropriate sensor technologies and have autopsies performed on failed machines in order to confirm failure mode. This approach offers experiential validity over prognostic algorithms based on physics-of-failure logic.

The invention aggregates condition-based data histories into "prognostic knowledge-bases" associated with a given failure mode or category of similar failure modes. These prognostic knowledge bases and the prognostic methodology described herein serve as an analysis "audit trail" for later review by authorized end users. This feature is an advantage over "black box" prognostic methods that have no visibility of method or associated data.

The invention's prognostic methodology yields, for an operating machine, a point estimate of remaining life conditioned on failure mode specific symptom values and a confidence bounds around this point estimate that measures statistical uncertainty. This confidence bounds aspect is an advantage over point-only estimates because end-users can incorporate this statistical uncertainty measure into their machine replacement decisions. For the purposes of this specification and claims, an "operating machine" is a machine that is operating in a given environment, diagnosed as having a primary failure mode underway, and presenting a set of symptom and condition variable measurements made at points in time.

With sufficient prior history data, the invention can estimate both remaining machine life and other performance output metrics (such as energy consumption cost) for an operating machine presenting a set of multivariate symptoms and environmental conditions. With this data in-hand, the invention provides a decision methodology as to when to replace an operating machine. This replacement decision methodology is based on the expected performance output over an estimated remaining life of the operating machine versus that for a healthy machine (i.e., new, rebuilt to good-as-new condition, or used but in good-as-new condition). For the purposes of this specification and claims, "expected performance output over an estimated remaining life" is defined as a cumulative value of some performance or cost metric associated with an operating machine from the point of its latest operating time stamp value to the point of its expected failure. Furthermore, an "operating time stamp" is defined as a value, in units of calendar time, age, operating cycles, cumulative distance traveled, or other similar life-related metric, recorded when a set of symptom and condition measurements are made on an operating machine. Although this invention speaks of a single life metric (e.g., calendar time) associated with each set of symptom and condition measurements, it is understood that other embodiments can involve two or more life values (e.g., calendar time and cycles).

At any given point in a machine's operating life, it is consuming resources (e.g., energy, operating labor, wasted raw materials, and minor maintenance) to produce products or services of economic value. This consumption is often difficult to track, and so management often assumes this consumption is linear over a period of time. Indeed, in a healthy machine, regardless of age, such an assumption may be reasonable. However, operating machines with a progressing (non-instantaneous) failure mode may very well demonstrate a non-linear increasing cost of operation in terms of energy consumption, wasted throughput and operating labor, or control adjustments. In such cases, a "run-to-failure" policy can result in much higher operating and repair costs than for a replacement "on-condition" policy such as one offered by this invention. Moreover, the invention offers an alternative to a "hard-time" policy where a machine is replaced at a given age (or time interval) regardless of condition [see Smith (1 993)].

BRIEF DESCRIPTION OF THE DRAWINGS

FIG. 1 is an illustrative drawing of a prognostic knowledge-base containing hypothetical data for a generic machine as discussed below.

DESCRIPTION OF THE PREFERRED EMBODIMENTS

Description of the Prognostic Knowledge-Base

According to a preferred embodiment of this invention, access to multiple symptom and condition variables from a number of same-type machines that all live in a same-type operating environment is presumed. Here, a symptom variable is one associated with a particular type of failure mode (e.g., vibration) whereas a condition variable is associated with the operating environment (e.g., load or ambient temperature).

Each machine, at some time $t_i$ in its life, has a vector $\sigma_j$ of different symptom measurements as well as a vector $\gamma_i$ of different environmental condition measurements. Further suppose each machine is run-to-failure (presuming agreement on a common definition of failure) in its operating environment such that its time of failure, $t_0$, is known. For the purposes of this specification and claims, $t_0$, also called a "failure time stamp" is defined as a value, in units of calendar time, age, cycles, distance, or other similar life-related metric, recorded when an operating machine fails.

Each machine is autopsied to determine failure mode, and appropriate subsets of symptom and condition variables relevant to that failure mode are identified so as to construct a subset of appropriate symptom vectors $s_i$ from $\sigma_i$ and a subset of appropriate condition vectors $c_i$ from $\gamma_i$ for all $i \neq 0$. A scalar 'remaining life' value, $r_i = (t_0 - t_i)$, is subsequently computed for each time where a set of symptom and condition signals is recorded.

Thus, for any given machine, say the $k^{th}$ machine, that has failed according to a particular failure mode or category of failure modes, the machine's symptom and condition history (containing say n vectors, $s_i$, of m symptom measurements each as well as n vectors, $c_i$, of z condition measurements each) is assembled in matrix form in a data matrix, $H_k = [S_i^T C_i^T, r_i]$ for i=1, 2, . . . , n. This augmented matrix $H_k$ with (m+z+1) columns and n rows contains the numerical symptom and condition history of the $k^{th}$ machine plus its remaining life associated with each of the n symptom and condition vectors.

These symptom and condition vectors for the $k^{th}$ machine taken at n different points in time need not be equally spaced over time as in a traditional time-series. But rather, all the measurements within a particular vector are assumed to have been made simultaneously at time $t_i$. The notion of "simultaneous" measurement has some degree of operational flexibility in that if time is measured in days or hours, measurements taken seconds apart can still be considered as simultaneous measurements.

The histories of all those same-type machines that failed by the same failure mode (say there are "p" of them) could be aggregated into a "prognostic knowledge-base" $[H]=[H_1, H_2, \ldots, H_p]$ data cube. This cubic array of p matrices is a three-dimensional means of organizing and storing all relevant machine symptom, condition, and residual life history data necessary for prognosis given a particular failure mode diagnosis.

In practice, the size of $H_i$ may not be the same as $H_j$ in that one machine's history may consist of more or fewer measurement observations or symptom and condition variables than another same-type machine's history. Without adverse effect on any subsequent analyses, the size of [H] can be enlarged to accommodate the largest size $H_i$ and null matrices of appropriate size can be used to augment any smaller $H_j$.

Since same-type machines can have multiple failure modes or failure mode categories, the invention will require multiple prognostic knowledge-bases, [H], one for each combination of failure mode and same-type machine. Physical storage of these data can be on various media including paper; however, the preferred choice is computerized storage as relational data cubes.

Description of the Prognostic Methodology

Now consider, for a given [H] with large p and n dimensionality, a conditional probability model, R|s* where R is some probability distribution of residual life at given symptom values s* (a vector) with conditional probability density, f(r|s*), that consists of;

the possible numerical outcomes of residual life, R=r, at symptom values s* across the range [0, ∞], and a conditional probability density f(r|s*), a function of r|s* with properties:

f(r|s*)≧0 for all r|s*;

∫f(r|s*) dr=1, where the integral covers the range [0, ∞], and f(r|s*)=f(r)÷{1−∫f(s*) ds} where the integral covers the range [0, ∞].

Also restrict s to be non-decreasing in each of its values (i.e., each symptom's value does not decrease over time). This is akin to assuming machines are "non-healing" during their operational life.

This conditional probability model, (R=r|s*), can be thought of as a potential realization of a randomly drawn residual lifetime from the population of all possible residual lives found at a particular set of symptom values, s*. The conditional probability density function, f(r|s*), is a theoretical model of the relative frequency of residual life, r, at the given symptom values, s* (i.e., the probability of event [R=r] given symptom values s*).

Now, the probability space of f(r|s*) is just a smaller sub-space of the original probability space f(r, s*) because f(r|s*)=f(r,s*|s*)=f(r, s*)÷f(s*). We can say that, for any given symptom values vector, s*, the paired observations (r, s) across each of the p machine histories are "conditionally" independent even though the paired observations in the ordered set $\{(r_1, s_1)_k, (r_2, s_2)_k, \ldots, (r_m, s_m)_k\}$ for a typical machine's history (say the $k^{th}$ machine) are not themselves independent.

Suppose R|s* contains nonstationary conditional moments, meaning that the shape and scale of this conditional residual life distribution change as various symptom values increase which is a reasonable assumption as a machine approaches failure. This assumption precludes any pooling of sample data in [H] except across machine histories at given symptom values.

Finally, suppose an operational machine presenting a set of symptoms, s*, is diagnosed with a single pending failure mode. The diagnosis methodology, which is quite apart from the prognostic methodology described below, is assumed to produce no uncertainty such that its corresponding [H] can be identified with impunity, presuming it exists.

The invention idea is to approximate $(r_j, s^*)$ in any machine history, within the appropriate [H], with the paired observation $(r_k, s_k)$ in the smallest "neighborhood" around $(r_j, s^*)$. For example, the choice of k could give the smallest absolute value difference, $|s_k-s^*|$, across all m symptom values for k=1, 2, . . . , n where n is the number of paired observations in that machine's history.

Since some number, q, of machines in [H] will have failed prior to reaching symptom values s* and since we assume each machine history is statistically independent of the other, we can say that the probability of a typical machine failing prior to s* is q÷p, i.e., F(s*)={∫f(s*) ds}≈q/p→f(r|s*)≈1/p÷{1−q/p}=f_p(r|s*).

By definition, the conditional expectation of residual life for those machines reaching symptom values s* is:

$$E\{R|s^*\}=\int rf(r|s^*)\, dr \approx \{\Sigma r_k f_p(r|s^*)=E_p\{R|s^*\}\} \tag{1}$$

where the summation ranges across all p machine histories in [H].

Likewise, the conditional variance of residual life for machines that reach symptom values s* is:

$$\mathrm{Var}\{R|s^*\}=\int \{r-E(R|s^*)\}^2 f(r|s^*)\, dr \approx \Sigma\{r_k-E_p(R|s^*)\}^2,$$
$$f_p(r|s^*)=\mathrm{Var}_p\{R|s^*\} \tag{2}$$

where the summation ranges across all p machine histories in [H].

As discussed above, one key quality aspect of prognosis is uncertainty in the estimate of remaining life. We address this matter of uncertainty by way of the Central Limit Theorem which holds that the large-sample distribution of the conditional mean in a random sample from f(r|s*) is a normally distributed Z such that;

$$Z=[(\Re|s^*)-E\{R|s^*\}]\div[\mathrm{Var}\{R|s^*\}^{1/2}\div p^{1/2}] \tag{3}$$

where $\Re$ is the true mean of the conditional population and p is the sample size of machine histories in [H].

Thus, using equations (1), (2), and (3) above, a prognosis (point estimate of remaining life with confidence bounds) for an operating machine diagnosed with a failure mode represented in [H] and presenting symptom values s*, is:

$$E_p\{R|s^*\}\pm Z[\mathrm{Var}_p\{R|s^*\}^{1/2}\div p^{1/2}$$

where Z is a Standard Normal density function which can be found in any Standard Normal Distribution Function table.

Part of the invention is to approximate $(r_j, s^*)$ in any machine history in [H] with the paired observation $(r_k, s_k)$ in the smallest "neighborhood" around $(r_j, s^*)$. As an example of this smallest neighborhood concept, we suggested the choice of k could give the smallest absolute value difference, $|s_k-s^*|$, across all m symptom values for k=1, 2, . . . , n where n is the number of paired observations in that machine's history. There are many other embodiments of this smallest neighborhood concept to include scaling certain symptoms according to a weighting scheme vector a, i.e., search for the k that yields the smallest absolute value difference, $|a^T s_k - a^T s^*|$. Another embodiment is to search for the k that yields the smallest squared value difference, $(a^T s_k - a^T s^*)^2$.

Description of the Replacement Decision Methodology

In the prognostic methodology described above, only symptom vectors and their associated remaining life vector from an appropriate [H] are used to derive a point estimate (and confidence bounds) of remaining life in an operational machine diagnosed with a particular failure mode and presenting a set of symptoms over time. However, in addition to this information, end-users may want to discard some remaining life in an operating machine by replacing (or repairing) it prior to failure. Their motivation, in this case, is economic.

Among various choices of condition, suppose end users were to measure one or more characteristics associated with machine performance, e.g. energy consumption, at the same time symptom vectors are being captured. Consider these performance metrics, $e_i$, (in vector format) as a subset of the condition vectors, $c_i$. Assuming machine performance degrades at some unknown rate as a particular failure mode progresses towards failure, we can project the expected performance output (e.g. energy cost) of an operating machine over its estimated remaining lifetime.

The decision to replace, or repair, the operating machine, then, would be based on a comparison of the expected performance costs of the operating machine versus expected performance costs of a healthy machine plus the value of residual life in the operating machine. When the former becomes larger than the latter, it is clearly time to replace, or repair to good-as-new, the ailing machine. This aspect of the invention's analysis methodology is illustrated below using energy cost as an example performance metric.

Given an appropriate energy cost vector, a, such that $D=g(a^T e_i)$ represents the (per unit time) cost of energy consumption as a function, $g(\cdot)$, of the various efficiency metrics and given an [H] with large p and n dimensionality; consider a conditional probability model, D|s* where D is some probability distribution of energy consumption cost ("ECC") values at given symptom values s* (a vector) with conditional probability density, f(d|s*) that consists of:

the possible numerical outcomes of ECC, D=d, at symptom values s* across the range [0, ∞], and a conditional probability density f(d|s*), a function of d|s* with properties:

f(d|s*)≧0 for all d|s*;

∫f(d|s*)dd=1, where the integral covers the range [0, ∞], and f(d|s*)=f(d)÷{1−∫f(s*)ds } where the integral covers the range [0, ∞].

This conditional probability model, (D=d|s*), can be thought of as a potential realization of a randomly drawn ECC value from the population of all possible ECC values found at a particular set of symptom values, s*. The conditional probability density function, f(d|s*), is a theoretical model of the relative frequency of ECC, d, at the given symptom values, s* (i.e., the probability of event [D=d] given symptom values s*).

Similar to the arguments made earlier, the probability space of f(d|s*) is just a smaller sub-space of the original probability space f(d, s*) because f(d|s*)=f(d,s*|s*)=f(d, s*)÷f(s*). Also, for any given symptom values vector, s, the paired observations (d, s) across each of the p machine histories are "conditionally" independent even though the paired observations in the ordered set $\{(d_1,s_1)_k, (d_2, s_2)_k, \ldots, (d_m, s_m)_k\}$ for a typical machine's history (say the $k^{th}$ machine) are not themselves independent.

Finally, suppose an operational machine presenting a set of symptoms, s*, is diagnosed with a single pending failure mode such that an appropriate [H] can be used to estimate its ECC over its expected remaining lifetime.

The invention idea is to approximate (d, s*, r) in any machine history, within the appropriate [H], with the triplet observation $(d_k, s_k, r_k)$ in the smallest "neighborhood" around $(d_j, s^*, r_j)$. For example, the choice of k could give the smallest absolute value difference, $|s_k-s^*|$, across all m symptom values for k=1, 2, ..., n where n is the number of paired observations in that machine's history.

Since some number, q, of machines in [H] will have failed prior to reaching symptom values s* and since we assume each machine history is statistically independent of the other, we can say that the probability of a typical machine failing prior to s* is q÷p;

i.e., $F(s^*)=\{\int f(s^*)ds\} \approx q/p \rightarrow f(d|s^*) \approx 1/p \div \{1-q/p\} = f_p(d|s^*)$.

Now, the conditional expectation of ECC for the estimated remaining life of those machines reaching symptom values s* is:

$$E\{ECC|s^*\}=\int \{\int dr\ dd\} f(r|s^*)dr \approx \Sigma(\Sigma(d_{k+i-1})\ r_{k+i})$$
$$f_p(d|s^*)=E_p\{ECC|s^*\} \quad (4)$$

where, in the inner summation i={0, 1, 2, ..., ∞} & $d_{k-1}$≡0, and the outer summation ranges across all p machine histories in [H].

As discussed above, this estimated energy consumption cost over the expected remaining life of an operating machine presenting a set of symptoms s* must be compared against the sum of the value of residual life in the operating machine, which would be discarded upon machine replacement prior to failure, plus the estimated energy consumption cost of a healthy same-type machine over the same remaining life time horizon.

Clearly, the value of remaining life in an ailing operating machine is a function of its initial capital cost or purchase price rather than its accounting valuation or financial "book value". One approach is to amortize the purchase price of the operating machine over its entire expected lifetime and compute its remaining life value accordingly.

As for the estimated energy consumption cost of a healthy machine over the ailing machine's remaining life time horizon, one could use symptom and condition data from healthy same-type machines, say taken at birth, provided such data demonstrate no evidence of a pending failure mode.

Though energy consumption cost, ECC, is used above to illustrate the invention's replacement decision methodology, many other performance output metrics could be considered to include production output measures, profit aspects, and penalty fees to name a few.

Example of the Prognostic and the Replacement Decision Methodologies

Suppose we have access to run-to-failure data on three generic machines of the same type that had been run in the same type environment and that all failed as a result of the same generic failure mode. A hypothetical example of these data are shown in the Machinery History Table below. The symptom variables, s, of this generic failure mode are surface temperature (measured in degrees Fahrenheit) and vibration velocity (measured in units of inches per second). Associated with the progression of this failure mode is a gradual loss in work efficiency (a conditional variable, e) that can be translated into a "power consumption cost per day" value, d.

| Machine History Data For Generic Machine | | | | |
|---|---|---|---|---|
| | Operating Time | Failure Time | Symptom Variables | | Condition Variable |
| Machine ID | Stamp (day) | Stamp (day) | Temp (° F.) | Vibration (in/sec) | Power Cost ($/day) |
| A | 5 | 160 | 110 | 0.05 | 1.0 |
| A | 35 | 160 | 112 | 0.07 | 1.0 |
| A | 65 | 160 | 112 | 0.09 | 1.0 |
| A | 95 | 160 | 114 | 0.11 | 1.2 |
| A | 125 | 160 | 118 | 0.25 | 1.4 |
| A | 145 | 160 | 122 | 0.39 | 1.8 |
| A | 153 | 160 | 135 | 0.52 | 1.9 |
| A | 155 | 160 | 153 | 0.79 | 2.0 |
| A | 157 | 160 | 164 | 0.95 | 2.1 |
| A | 159 | 160 | 189 | 1.25 | 2.1 |
| B | 30 | 140 | 124 | 0.11 | 1.1 |
| B | 60 | 140 | 124 | 0.13 | 1.1 |
| B | 90 | 140 | 125 | 0.13 | 1.1 |
| B | 120 | 140 | 131 | 0.18 | 1.4 |
| B | 125 | 140 | 148 | 0.28 | 1.7 |
| B | 130 | 140 | 159 | 0.35 | 2.0 |
| B | 132 | 140 | 164 | 0.49 | 2.2 |
| B | 134 | 140 | 176 | 0.64 | 2.3 |
| B | 136 | 140 | 183 | 0.75 | 2.4 |
| B | 138 | 140 | 199 | 0.87 | 2.5 |
| C | 10 | 370 | 112 | 0.02 | 0.9 |
| C | 40 | 370 | 112 | 0.06 | 1.0 |
| C | 70 | 370 | 112 | 0.08 | 1.0 |
| C | 100 | 370 | 115 | 0.12 | 1.2 |
| C | 130 | 370 | 117 | 0.15 | 1.3 |
| C | 320 | 370 | 135 | 0.33 | 1.6 |
| C | 330 | 370 | 152 | 0.52 | 1.9 |
| C | 340 | 370 | 180 | 0.79 | 2.1 |

-continued

Machine History Data For Generic Machine

| Machine ID | Operating Time Stamp (day) | Failure Time Stamp (day) | Symptom Variables | | Condition Variable |
|---|---|---|---|---|---|
| | | | Temp (° F.) | Vibration (in/sec) | Power Cost ($/day) |
| C | 350 | 370 | 197 | 0.95 | 2.3 |
| C | 360 | 370 | 210 | 1.25 | 2.4 |

Operating time stamped symptom and condition measurements are made periodically over the life of each machine; hence, calculated remaining life values, $r_i$, associated with each set of temperature and vibration data are in terms of "days of remaining life". These hypothetical symptom, condition (translated into cost), and remaining life values are assembled into a Prognostic Knowledge-Base as shown in FIG. 1.

The analysis of data in FIG. 1 for an operating generic machine presenting symptoms of surface temperature at 120° F. and vibration velocity at 0.30 in/sec yields an estimate of remaining life with statistical confidence bounds as follows:

Remaining Life Analysis for Operating Generic Machine

| Machine ID | Smallest Neighborhood Doublet* | Conditional Prob $f(r\|s^*)$ | $E(R\ s^*) = \Sigma r_k \times f(r\|s^*)$ | $Var(R\ s^*) = \Sigma (r_k - E(r))^2 \times f(r\|s^*)$ |
|---|---|---|---|---|
| A | (118, 0.25; 35) | 1/3 | 11.67 | 2315.16 |
| B | (124, 0.13; 80) | 1/3 | 26.67 | 489.98 |
| C | (117, 0.15; 240) | 1/3 | 80.00 | 4933.67 |
| | | Σ | 118.34 | 7738.81 |

Operating Machine Prognosis**: 118.34 days remaining life ± 99.55 days
*Smallest Neighborhood Formula: choose row doublet that gives smallest absolute value of difference of $\{(Temp_k - Temp^*) + 10\ (Vib_k - Vib^*)\}$
**Prognosis confidence bounds is 95%

Suppose the operating machine was originally purchased for $500 and has an operating time stamp of 200 days since it was first placed into operation. Based on the estimated remaining life of approximately 118 days, the straight-line depreciated value of this machine's remaining life can be computed as $500 multiplied by the ratio of estimated remaining life to total life (i.e. 118/318) or approximately $186.

Further suppose the power consumption cost per day of a healthy machine is $1 per day such that the estimated cost of power consumption for the 118 day remaining life time horizon is $118.

Using the Prognostic Knowledge-Base in FIG. 1, the analysis of estimated performance output (power consumption cost) over the expected remaining life of the operating machine is as follows:

Expected Performance Output Analysis for Operating Generic Machine

| Machine ID | Smallest Neighborhood Triplet* | $\Sigma(d_{k+i} - d_{k+i-1})r_{k+i}$ | Conditional Prob $f(d\|s^*)$ | $E(D\|s^*) =$ |
|---|---|---|---|---|
| A | (118, 0.25; 1.4; 35) | 1.4 × 35 = 49 | | |
| A | (122, 0.39; 1.8; 15) | 49 + (.4 × 15) = 55 | | |
| A | (135, 0.52; 1.9; 7) | 55 + (.1 × 7) = 55.7 | | |
| A | (153, 0.79; 2.0; 5) | 55.7 + (.1 × 5) = 56.2 | | |
| A | (164, 0.95; 2.1; 3) | 56.2 + (.1 × 3) = 56.5 | | |
| A | (189, 1.25; 2.1; 1) | 56.5 + (0 × 1) = 56.5 | 1/3 | 18.83 |
| B | (124, 0.13; 1.1; 80) | (1.1 × 80) = 88 | | |
| B | (125, 0.13; 1.1; 50) | 88 + (0 × 50) = 88 | | |
| B | (131, 0.18; 1.4; 20) | 88 + (.3 × 20) = 94 | | |
| B | (148, 0.28; 1.7; 15) | 94 + (.3 × 15) = 98.5 | | |
| B | (159, 0.35; 2.0; 10) | 98.5 + (.3 × 10) = 101.5 | | |
| B | (164, 0.49; 2.2; 8) | 101.5 + (.2 × 8) = 103.1 | | |
| B | (176, 0.64; 2.3; 6) | 103.1 + (.1 × 6) = 103.7 | | |
| B | (183, 0.75; 2.4; 4) | 103.7 + (.1 × 4) = 104.1 | | |
| B | (199, 0.87; 2.5; 2) | 104.1 + (.1 × 2) = 104.3 | 1/3 | 34.77 |
| C | (117, 0.15; 1.3; 240) | (1.3 × 240) = 312 | | |
| C | (135, 0.33; 1.6; 50) | 312 + (.3 × 50) = 327 | | |
| C | (152, 0.52; 1.9; 40) | 327 + (.3 × 40) = 339 | | |
| C | (180, 0.79; 2.1; 30) | 339 + (.2 × 30) = 345 | | |
| C | (197, 0.95; 2.3; 20) | 345 + (.2 × 20) = 349 | | |
| C | (210, 1.25; 2.4; 10) | 349 + (.1 × 10) = 350 | 1/3 | 116.67 |
| | | | Σ | 170.27 |

*Smallest Neighborhood Formula: choose row triplet that gives smallest absolute value of difference of $\{(Temp_k - Temp^*) + 10\ (Vib_k - Vib^*)\}$ Thus, by comparing the estimated $170.27 cost of power consumption for the operating machine over its expected remaining life versus the estimated $118 cost of power consumption for a healthy machine plus the $186 value of expected remaining life (that would be discarded if the operating machine were to be replaced), a user would conclude that it is not economically advisable to replace the operating machine at this point in its life.

I claim:

1. A method for estimating the remaining life in an operating machine comprising:

accumulating symptom data, condition data and time stamp data from machines the same or similar to the operating machine, the symptom data and the condition data measured and recorded at various times $t_i$, including time of failure $t_0$ and failure mode;

calculating remaining life values associated with each set of accumulated symptom data and condition data recorded for each machine of the machines;

assembling the symptom data, the condition data, and the remaining life values into prognostic knowledge-bases according to machine type, operating environment, and failure mode;

storing the prognostic knowledge-bases in matrix arrays to facilitate mathematical analyses for the purpose of predicting remaining life in the operating machine running in a certain environment, diagnosed with a certain failure mode, and presenting a set of symptom data (s*) and condition data; and analyzing data in a prognostic knowledge-base of the prognostic knowledge-bases appropriate to the operating machine for the purpose of estimating the remaining life in the operating machine and determining a statistical confidence bounds around the estimate of remaining life.

2. The method of claim 1 wherein accumulating symptom data and condition data further comprises the steps of:
 a. identifying sets of symptom variables germane to particular failure modes for the machines same or similar to the operating machine;
 b. defining consensus states of machine failure;
 c. defining consensus failure modes for the machines such that a primary cause of failure can be determined accurately and consistently; and
 d. acquiring the symptom data along with time-stamp identification as to when each set of symptom data was acquired, when the machines had failed, and what was the primary cause of failure.

3. The method of claim 1 wherein calculating remaining life values associated with each set of accumulated symptom data and condition data recorded for a given machine of the machines further comprises the steps of:
 a. subtracting an operating time-stamp value made when a set of symptom data and condition data were measured from a failure time-stamp value made at the time of machine failure resulting in a remaining life value associated with each set of symptom data and condition data; and
 b. translating the remaining life value into units of measure that are common to those of other same-type machines.

4. The method of claim 1 wherein assembling the symptom data, the condition data, and the remaining life values into prognostic knowledge-bases further comprises the steps of:
 a. identifying a number m of different symptom variables and a number z of different condition variables within a single machine history that are appropriate to its primary failure mode as determined during that machine's autopsy; and
 b. creating a machine history matrix with (m+z+1) columns and n rows and populating the machine history matrix with the symptom data, the condition data and the remaining life values.

5. The method of claim 4 further comprising the step of:
 c. combining a number p of all machine history matrices, for machines the same or similar to the operating machine and failed according to the same or similar failure mode, into the prognostic knowledge-base matrix array wherein symptom data, condition data, and remaining life values are aligned by column within the knowledge-base matrix array with any empty column cells filled with zeroes.

6. The method of claim 1 wherein storing the prognostic knowledge-bases in matrix arrays for the purpose of predicting remaining life in the operating machine further comprises the steps of:
 a. transferring the prognostic knowledge-bases matrix arrays into electronic media suitable for rapid retrieval and analysis via computer programs; and
 b. updating the prognostic knowledge-bases matrix arrays by appending a newly acquired machine history matrix to its appropriate prognostic knowledge-base matrix array as another layer in the array.

7. The method of claim 1 wherein analyzing data in the prognostic knowledge-base further comprises the steps of:
 a. extracting those cell values of symptom variables and their corresponding remaining life found on a row, k, within a layer of the prognostic knowledge-base matrix array such that the symptom data found on that row are in a "smallest neighborhood" around s*, such extraction of single doublets $(s_i^T, r_i)$ occurring for every layer in the matrix array;
 b. determining those layers of the prognostic knowledge-base matrix array that correspond to a machine that failed prior to attaining any one of the symptom value levels described in s*, the number of said layers is q out of p total layers, and the remaining life value in each extracted row of these q layers is set at zero;
 c. computing the conditional probability of observing in the matrix array a non-zero remaining life value extracted per Step a. above as $\{(1/p)/((p-q)/p)\}$;
 d. computing the conditional expected value of remaining life by multiplying each non-zero extracted remaining life value per Step a. by its conditional probability calculated per Step c. and summing each multiplication;
 e. computing the conditional variance of remaining life by multiplying the square of each non-zero extracted remaining life value per Step a. less the conditional expected value of remaining life per Step d. by its conditional probability calculated per Step c. and summing each multiplication; and
 f. computing an estimate of remaining life with confidence bounds as the conditional expected value of remaining life per Step d. plus and minus an appropriate Standard Normal density value, Z, multiplied by the square root of the conditional variance per Step e. and divided by the square root of the number p of total layers in the matrix array.

8. A method for determining when to replace an operating machine comprising:

accumulating symptom data, condition data and time stamp data from machines the same or similar to the operating machine, the symptom data and the condition data measured and recorded at various times $t_i$, including time of failure $t_0$ and failure mode;

calculating remaining life values associated with each set of accumulated symptom data and condition data recorded for each machine of the machines;

assembling the symptom data, the condition data, and the remaining life values into prognostic knowledge-bases according to machine type, operating environment and failure mode;

storing the prognostic knowledge-bases in matrix arrays to facilitate mathematical analyses for the purpose of estimating the future performance output in the operating machine running in a certain environment, diagnosed with a certain failure mode, and presenting a set of symptom data (s*) and condition data; and analyzing data in a prognostic knowledge-base of the prognostic knowledge-bases appropriate to the operating machine for the purpose of estimating a performance output over an expected lifetime of the operating machine.

9. The method of claim 8 wherein accumulating symptom data and condition data further comprises the steps of:
   a. identifying sets of symptom variables germane to particular failure modes for the machines same or similar to the operating machine;
   b. identifying sets of condition variables for the machines that may have some effect on the deterioration time frame for a particular failure mode as evidenced by certain symptom variables or that are affected themselves by the degree of deterioration for a particular failure mode;
   c. defining consensus states of machine failure;
   d. defining consensus failure modes for the machines such that a primary cause of failure can be determined accurately and consistently; and
   e. acquiring the symptom data and the condition data along with time-stamp identification as to when each set of symptom data and condition data was acquired, when the machines had failed, and what was the primary cause of failure.

10. The method of claim 8 wherein calculating remaining life values associated with each set of accumulated symptom data and condition data recorded for a given machine of the machines further comprises the steps of:
   a. subtracting an operating time-stamp value made when a set of symptom data and condition data were measured from a failure time-stamp value made at the time of machine failure resulting in a remaining life value associated with each set of symptom data and condition data; and
   b. translating the remaining life value into units of measure that are common to those of other same-type machines.

11. The method of claim 8 wherein assembling the symptom data, the condition data, and the remaining life values into prognostic knowledge-bases further comprises the steps of:
   a. identifying a number m of different symptom variables and a number z of different condition variables within a single machine history that are appropriate to its primary failure mode as determined during that machine's autopsy; and
   b. creating a machine history matrix with (m+z+1) columns and n rows and populating the machine history matrix with the symptom data, the condition data and the remaining life values.

12. The method of claim 11 further comprising the step of:
   c. combining a number p of all machine history matrices, for machines the same or similar to the operating machine and failed according to the same or similar failure mode, into the prognostic knowledge-base matrix array wherein symptom data, condition data, and remaining life values are aligned by column within the knowledge-base matrix array with any empty column cells filled with zeroes.

13. The method of claim 8 wherein storing the prognostic knowledge-bases in matrix arrays for the purpose of predicting the performance output over the lifetime of the operating machine further comprises the steps of:
   a. transferring the prognostic knowledge-bases matrix arrays into electronic media suitable for rapid retrieval and analysis via computer programs; and
   b. updating the prognostic knowledge-bases matrix arrays by appending a newly acquired machine history matrix to its appropriate prognostic knowledge-base matrix array as another layer in the array.

14. The method of claim 8 wherein estimating the output over an expected lifetime of the operating machine further comprises the steps of:
   a. identifying subsets, $e_i$, of condition variables that are associated with a certain machine's performance and determining the relationship of a performance output $d_i$ in terms of performance related variables;
   b. extracting those cell values of symptom variables, their corresponding performance related output values, and their corresponding remaining life values found on and below a certain row, k, within a layer of an appropriate matrix array such that the symptom values found on that row are in the "smallest neighborhood" around s*, such extraction of multiple triplets $(s_i^T, d_i^T, r_i)$ occurring for each layer in the matrix array;
   c. determining those layers of the matrix array that correspond to a machine that failed prior to attaining any one of the symptom value levels described in s*, the number of the layers is q out of p total layers, and the remaining life value in each extracted triplet of these q layers is set at zero;
   d. calculating, for each layer, the sum of multiplications of the difference $d_{k+i}$ minus $d_{k+i-1}$ times the value $r_{k+i}$ for $i=0, 1, 2, \ldots, \infty$;
   e. computing the conditional probability of observing in any layer of the matrix array a non-zero sum calculated per Step d. above as $\{(1/p)/((p-q)/p)\}$; and
   f. computing the conditional expected value of performance output over the conditional expected remaining life by multiplying each non-zero sum per Step d. by its conditional probability calculated per Step e. and summing each multiplication.

15. The method of claim 8 wherein deciding when to replace the operating machine based upon the estimate of remaining life further comprises the steps of:
   a. determining the expected performance output of a healthy machine over the expected lifetime of the operating machine and converting said performance value into monetary units;
   b. determining the economic value of expected remaining life in the operating machine;
   c. computing the sum of the monetary values found in Steps a and b; and
   d. comparing at least one of a future economic impact and a future performance impact of the operating machine with the result of Step c to determine whether to replace the operating machine.

16. A method for estimating the remaining life in an operating machine comprising:
   accumulating symptom data, condition data and time stamp data at which the symptom data and the condition data was acquired, time of failure data, and failure mode data, from machines the same or similar to the operating machine;
   calculating remaining life values associated with each set of accumulated symptom data and condition data from the time stamp data and time of failure recorded for the machines;
   assembling the symptom data, the condition data, and the remaining life values into a prognostic knowledge-base matrix array; and analyzing the prognostic knowledge-base matrix array to estimate the remaining life in the operating machine with a statistical confidence bounds.

17. The method of claim 16 wherein calculating remaining life values associated with each set of accumulated symptom data, condition data and time data recorded for a given machine of the machines further comprises the step of:
    determining each remaining life value of the remaining life values from an operating time-stamp value made when a set of symptom data and condition data were measured and a failure time-stamp value made at the time of machine failure.

18. The method of claim 16 wherein assembling the symptom data, the condition data, and the remaining life values into prognostic knowledge-bases further comprises the steps of:
    creating a machine history matrix with (m+z+1) columns, where there are m different symptom variables and z different condition variables within a single machine history, and n rows and populating the machine history matrix with the symptom data, the history data and the remaining life values; and
    combining a number p of all machine history matrices into the prognostic knowledge-base matrix array wherein symptom data and condition data are aligned by column within the knowledge-base matrix array.

19. The method of claim 16 wherein analyzing data in the prognostic knowledge-base further comprises the steps of:
    a. extracting values of symptom variables and their corresponding remaining life found in the prognostic knowledge-base matrix array;
    b. computing a conditional probability of observing, in the matrix array, remaining life values extracted per Step a. above;
    c. computing a conditional expected value of remaining life;
    d. computing a conditional variance of remaining life; and
    f. computing an estimate of remaining life with statistical confidence bounds.

20. A method for determining when to replace an operating machine comprising:
    accumulating symptom data, condition data and time stamp data at which the symptom data and the condition data was acquired, from machines the same or similar to the operating machine;
    calculating remaining life values associated with each set of accumulated symptom data, condition data and time stamp data recorded for the machines;
    assembling the symptom data, the condition data, and the remaining life values into a prognostic knowledge-base matrix array; and
    analyzing the prognostic knowledge-base matrix array to estimate the performance output over the expected lifetime of the operating machine.

21. The method of claim 20 wherein calculating remaining life values associated with each set of accumulated symptom data and condition data recorded for a given machine of the machines further comprises the step of:
    determining each remaining life value of the remaining life values from an operating time-stamp value made when a set of symptom data and condition data were measured and a failure time-stamp value made at the time of machine failure.

22. The method of claim 20 wherein assembling the symptom data, the condition data, and the remaining life values into prognostic knowledge-bases further comprises the steps of:
    creating a machine history matrix with (m+z+1) columns, where there are m different symptom variables and z different condition variables within a single machine history, and n rows and populating the machine history matrix with the symptom data, the condition data and the remaining life values; and
    combining a number p of all machine history matrices into the prognostic knowledge-base matrix array wherein symptom data, condition data, and remaining life values are aligned by column within the knowledge-base matrix array.

23. The method of claim 20 wherein storing the prognostic knowledge-bases in matrix arrays for the purpose of predicting performance output over the lifetime of the operating machine further comprises the steps of:
    a. transferring the prognostic knowledge-bases matrix arrays into electronic media suitable for rapid retrieval and analysis via computer programs; and
    b. updating the prognostic knowledge-bases matrix arrays by appending a newly acquired machine history matrix to its appropriate prognostic knowledge-base matrix array as another layer in the array.

24. The method of claim 20 wherein estimating at least one of the future economic impact and the future performance impact of the operating machine further comprises the steps of:
    a. identifying subsets of condition variables that are associated with a certain machine's performance and determining the relationship of a performance output in terms of performance related variables;
    b. extracting those cell values of symptom variables, their corresponding performance related variables, and their corresponding remaining life value occurring for each layer in the prognostic knowledge-base matrix array; and
    c. computing the conditional expected value of performance output over the conditional expected remaining life.

25. The method of claim 20 wherein deciding when to replace the operating machine based upon the estimate of its remaining life further comprises the steps of:
    a. determining the expected performance output of a healthy machine over the expected lifetime of the operating machine and converting said performance value into monetary units;
    b. determining the economic value of expected remaining life in the operating machine;
    c. computing the sum of the monetary values found in Steps a and b; and
    d. comparing at least one of the future economic impact and the future performance impact of the operating machine with the result of Step c to determine whether to replace the operating machine.

26. A method for estimating the remaining life in a generic operating machine diagnosed with a generic failure mode and presenting symptoms of a given surface temperature and a given vibration velocity comprising the steps of:
    accumulating symptom data, condition data, and time stamp data from machines the same or similar to the operating machine, the symptom data and the condition data measured and recorded at various times $t_i$ and the time of failure $t_0$ and failure mode also recorded as in a Machine History Table;
    calculating remaining life values associated with each set of accumulated symptom data and condition data recorded for each of the failed machines from the available time stamp data;

assembling the symptom data, the condition data, and the remaining life values into a prognostic knowledge-base matrix array; and analyzing the prognostic knowledge-base matrix array to estimate the remaining life in the generic operating machine with a predetermined statistical confidence bounds.

27. A method for determining when to replace a generic operating machine diagnosed with a generic failure mode and presenting symptoms of a given surface temperature and a given vibration velocity comprising:

accumulating symptom data, condition data, and time stamp data from machines the same or similar to the operating machine, the symptom data and the condition data measured and recorded at various times $t_i$ and the time of failure $t_0$ and failure mode also recorded;

calculating remaining life values associated with each set of accumulated symptom data and condition data recorded for each of the failed machines from the available time stamp data;

assembling the symptom data, the condition data, and the remaining life values into a prognostic knowledge-base matrix array;

analyzing the prognostic knowledge-base matrix array to estimate the performance output over the expected remaining life of the operating machine; and comparing the estimated performance output over the expected remaining life of the operating machine against the expected performance output of a healthy machine over the same time horizon plus the economic value of expected remaining life in the operating machine.

* * * * *